United States Patent
Ramos et al.

(10) Patent No.: US 11,768,296 B2
(45) Date of Patent: Sep. 26, 2023

(54) DYNAMIC ASSIGNMENT OF DEVICES BASED ON PRECISION SENSORS

(71) Applicant: International Business Machines Corporation, Armonk, NY (US)

(72) Inventors: Igor S. Ramos, Round Rock, TX (US); Anindita Das, Austin, TX (US); Ohannes Ohannessian, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 17/064,642

(22) Filed: Oct. 7, 2020

(65) Prior Publication Data
US 2022/0107424 A1    Apr. 7, 2022

(51) Int. Cl.
G06Q 30/02       (2023.01)
G01S 19/01       (2010.01)
G06F 9/48        (2006.01)
G06Q 30/0283     (2023.01)

(52) U.S. Cl.
CPC .......... *G01S 19/01* (2013.01); *G06F 9/4881* (2013.01); *G06Q 30/0283* (2013.01)

(58) Field of Classification Search
CPC .............. G06Q 30/02; G06Q 10/0631; G06Q 10/06311; G06Q 10/06313; G06Q 10/06312; G06F 9/04
See application file for complete search history.

(56) References Cited

U.S. PATENT DOCUMENTS

| | | | | |
|---|---|---|---|---|
| 2005/0209902 A1* | 9/2005 | Iwasaki | .......... | G06Q 10/063114 705/7.14 |
| 2006/0108434 A1* | 5/2006 | Kallestad | ................ | F26B 25/22 700/277 |
| 2010/0268562 A1* | 10/2010 | Anderson | ........ | G06Q 10/06313 705/7.25 |

(Continued)

FOREIGN PATENT DOCUMENTS

| | | | | |
|---|---|---|---|---|
| CN | 108765763 A | | 11/2018 | |
| EP | 3567539 A1 | * | 11/2019 | ......... G06F 17/5009 |
| WO | 2017186096 A1 | | 11/2017 | |

OTHER PUBLICATIONS

"Uber for Lawn Care & Yard Work Services App | Software Solution", Appscrip, Copyright © 2020 Appscrip, 45 pages, <file:///Volumes/projects-3/1-Dockets/P [Think IP]/2019/P201910134US01/Uber_NPL.html>.
"Uber for Lawn Mowing Service App", V3Cube, © Copyright 2005-2020, 8 pages, <https://www.v3cube.com/uber-for-lawn-mowing-app/>.

(Continued)

*Primary Examiner* — Vincent M Cao
(74) *Attorney, Agent, or Firm* — Jordan A. Lewis; Heather Johnston

(57) ABSTRACT

Embodiments of the present invention provide a computer system a computer program product, and a method that comprises, in response to receiving a request for a task to be performed, optimizing configured operational parameters based on prioritized user parameters and environmental details associated with the task; calculating a value of the task based, at least in part, the optimized configured parameters, environmental details associated with the task, and prioritized user parameters; and performing the task based on the optimized, configured parameters and calculated value.

20 Claims, 4 Drawing Sheets

(56) References Cited

U.S. PATENT DOCUMENTS

| | | | |
|---|---|---|---|
| 2013/0151298 A1* | 6/2013 | Davis | G06Q 40/04 |
| | | | 705/7.14 |
| 2013/0181825 A1 | 7/2013 | Johnson | |
| 2016/0298977 A1* | 10/2016 | Newlin | G01C 21/3679 |
| 2017/0310770 A1* | 10/2017 | Samaan | H04L 67/53 |
| 2018/0032944 A1* | 2/2018 | Sarvana | G06Q 10/063114 |
| 2018/0075380 A1* | 3/2018 | Perl | G06Q 50/30 |
| 2018/0096308 A1* | 4/2018 | Roseman | G06Q 10/1093 |
| 2018/0224866 A1* | 8/2018 | Alonso-Mora | G06N 5/04 |
| 2019/0196503 A1* | 6/2019 | Abari | G06Q 10/02 |
| 2019/0236515 A1* | 8/2019 | Murdock | G06Q 10/10 |
| 2019/0304204 A1 | 10/2019 | Gao | |
| 2019/0354114 A1* | 11/2019 | Goldman | G05D 1/0297 |
| 2020/0005198 A1* | 1/2020 | Nazerzadeh | G06Q 10/06315 |
| 2020/0029490 A1* | 1/2020 | Bertucci | G06V 20/58 |
| 2021/0065259 A1* | 3/2021 | Luong | G06Q 30/016 |

OTHER PUBLICATIONS

Codol et al., "Safety robotic lawnmower with precise and low-cost L1-only RTK-GPS positioning", ResearchGate, Mar. 31, 2015, 5 pages.

Partel et al., "Development and Evaluation of a Low-Cost and Smart Technology for Precision Weed Management Utilizing Artificial Intelligence", Accepted Dec. 23, 2018, 12 pages, >https://doi.org/10.1016/j.compag.2018.12.048>.

Gaines, Tharran, "The Future of Robotic Weeders", Nov. 29, 2018, 1 page, <https://www.agriculture.com/technology/robotics/the future-of-robotic-weeders>.

Isaacs, Julienne, "Equipment sharing is on the rise", Published: Feb. 21, 2017, 3 pages, <https://www.grainews.ca/features/why-farm-equipment-sharing-is-on-the-rise/>.

Miller et al., "Just Keep Rolling a Lawn ION's Autonomous Mowers", GPS World, Sep. 2004, 8 pages.

* cited by examiner

DYNAMIC ASSIGNMENT OF DEVICES BASED ON PRECISION SENSORS

FIELD OF INVENTION

The present invention relates generally to the field of navigational systems and digital ownership technology, and more specifically automatically locating a device in one's possession using precision sensors.

BACKGROUND

A sensor is a device, module, machine, or subsystem whose purpose is to detect events or changes in its environment and send the information to other electronics, frequently a computer processor. Generally, a sensor is used with other electronics. Sensors are used in everyday objects such as touch-sensitive elevator buttons, which are considered tactile sensors, and lamps that dim or brighten by touching the base. With advances in micromachinery and easy-to use microcontroller platforms, the uses of sensors have expanded beyond its traditional fields.

Ownership is the state or fact of exclusive rights and control over property, which may be an object, land or real estate, or intellectual property. Ownership involves multiple rights, collectively referred to as title, which may be separated and held by different parties. Ownership is self-propagating in that the owner of any property will also own the economic benefits of that property. Digital ownership is the use or permission to access data, information, and knowledge about an individual and the objects the individual owns.

A tracking system is used for the observing of persons or objects on the move and supplying a timely sequence of location data for further processing.

SUMMARY

Embodiments of the present invention provide a computer system a computer program product, and a method that comprises, in response to receiving a request for a task to be performed, optimizing configured operational parameters based on prioritized user parameters and environmental details associated with the task; calculating a value of the task based, at least in part, the optimized configured parameters, environmental details associated with the task, and prioritized user parameters; and performing the task based on the optimized, configured parameters and calculated value.

DETAILED DESCRIPTION

Embodiments of the present invention recognize the need for an improvement to navigational systems and tracking systems for assigning ownership of individual devices by using precision sensors. Embodiments of the present invention provides systems, methods, and computer program products for a solution to locate a device, automatically assign ownership of the device, and track the movement of the owned devices using precision sensors. Currently, cost-sharing systems are used primarily on real estate or property. Embodiments of the present invention are an improvement on current cost-sharing systems by using algorithms to automatically apply the cost-sharing system to devices rather than real estate by using precision sensors, algorithms, and applications. Current tracking systems for devices use geo-fencing, which is a virtual perimeter for a real-world geographic area. Generally, geo-fences are dynamically generated (e.g., as in a radius around a point location), or a predefined set of boundaries. Embodiments of the present invention are an improvement on current tracking systems by providing the ability to track micromovements in real time using precision sensors incorporated within the device. Embodiments of the present invention executes a management application, locates the device, assigns ownership percentages, adjusts parameters, computes cost of task, and transmits instructions to initiate the device to perform the task.

Figure 1:
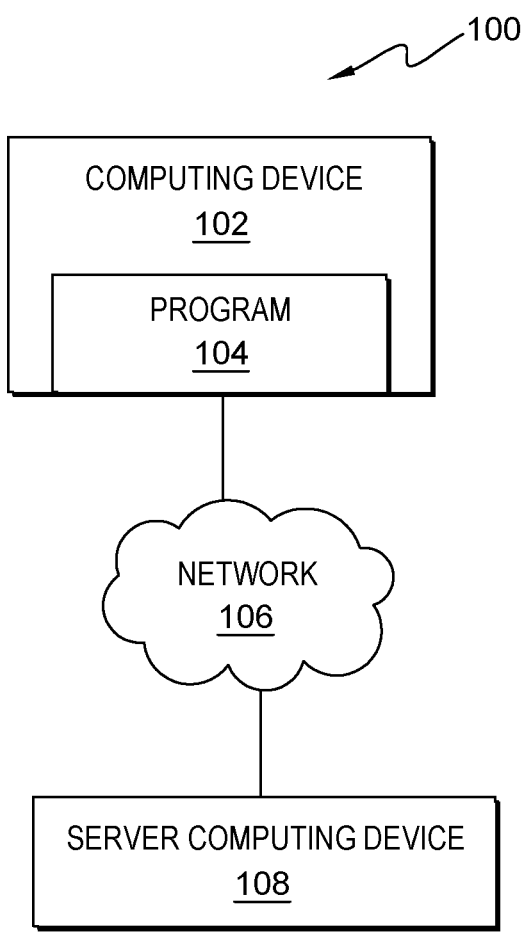
FIG. 1 is a functional block diagram depicting an environment with a computing device connected to or in connection with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, smart appliances, smart devices, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 5.

The computing device 102 may include a program 104. The program 104 may be a stand-alone program on the computing device 102. In another embodiment, the program 104 may be stored on a server computing device 108. In the embodiment, the program 104 executes a management application by downloading the application, configuring costing options, configuring task parameters, estimating a cost based on operation parameters, and automatically placing the device in a proper location. Downloading is defined as the process of copying data from one computing device 102 to another, such as the server computing device 108. In this embodiment, the program 104 locates a device by using global positioning algorithms and precision sensors. Precision sensors are sensors that are capable of detecting micromovements, collecting surrounding data, and allowing the program 104 to automatically operate the device that the precision sensors are incorporated within. Micromovements are ranges of motion done by a device short periods of times, and collections of micromovements may be pieced together to form a range of motion defined as a task. In this embodiment, the program 104 assigns ownership percentages by analyzing data collected through the management application, calculating percentages based on initial participant contribution, and ranking the calculated percentages. A participant contribution is defined as an amount of money or assets given by one of the owners or participants, and the participant contribution directly relates to the participant's assigned ownership percentage. In this embodiment, the program 104 adjusts parameters of the assigned ownership percentages by analyzing assigned ownership percentages, determining effect of participant preferences, and modifying assigned percentages based on determined participant preferences. In this embodiment, the program 104 computes the cost of the task by calculating the total cost of the task based on the data collected by the management application, assigned ownership percentages, and adjusted parameters; and predicting an output of the task using pattern recognition algorithms and artificial intelligence algorithms. The output is defined as the amount produced by the device. In this embodiment, the program 104 transmits instructions to the device perform the task by activating precision sensors incorporated in the device, which allows the program 104 to operate the device.

The network 106 can be a local area network ("LAN"), a wide area network ("WAN") such as the Internet, or a combination of the two; and it may include wired, wireless, or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network. The server computing device 108 may be a single computing device, a laptop, a collection of servers, and other known computing devices. In this embodiment, the server computing device 108 may be an external device connected to the computing device 102 via the network 106.

Figure 2:
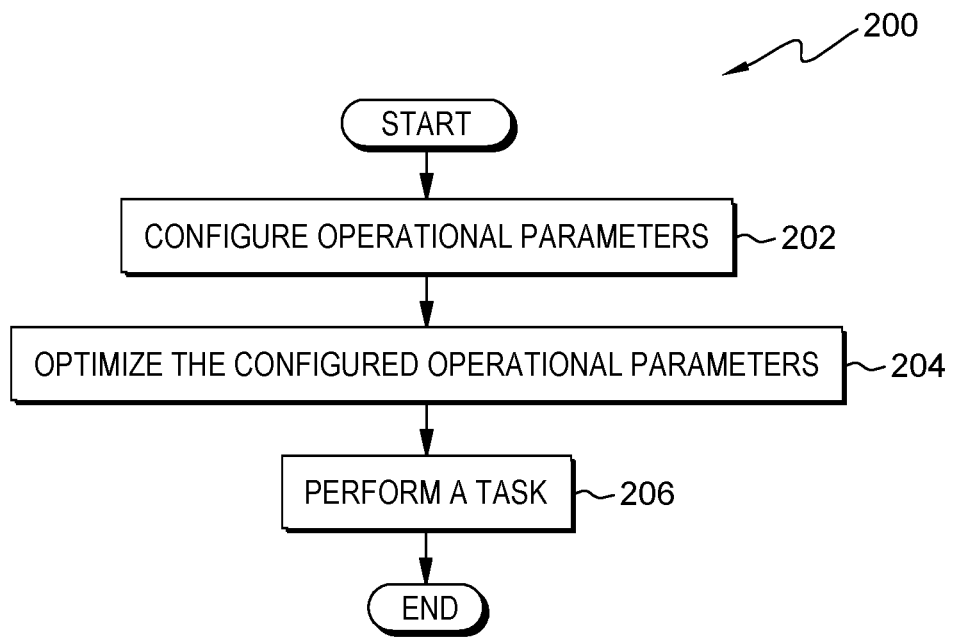
FIG. 2 is a flowchart illustrating operational steps for assigning ownership percentages for a device using precision sensors, in accordance with at least one embodiment of the present invention.

FIG. 2 is a flowchart 200 illustrating operational steps for optimizing a performance of a task, in accordance with at least one embodiment of the present invention.

In step 202, the program 104 configures operational parameters. In this embodiment, the program 104 configures operational parameters in response to receiving user input. In this embodiment, user input is defined as information pertaining to each user. For example, user input can include user preferences, user initial contributions, and social profiles for each user. In this embodiment, the program 104 can receive user input from computing device 102 via network 106. In other embodiments, the program 104 can receive user input (i.e., operational parameters) from one or more other components of computing environment 100.

In this embodiment, the program 104 configures operational parameters by formatting the received operational parameters, prioritizing the received parameters, and identifying device features. This step will be explained in greater detail in FIG. 3. In this embodiment, the program 104 formats the received operational parameters by receiving operational parameters through the management application. For example, the program 104 receives parameters detailing the type of the task, location of the task, and time of the task. In this embodiment, the program 104 prioritizes the received parameters based on user indicated preferences. For example, the program 104 ranks user A's preference in front of user B's preference. In this embodiment, the program 104 identifies device features using precision sensors or manual input. For example, the program 104 uses precision sensors to identify the grass cutting feature, the crop harvest feature, and the fertilizer distribution feature of the device.

In step 204, the program 104 optimizes the configured operational parameters. In this embodiment, the program 104 optimizes the configured operational parameters by identifying user indicated preferences, identifying environmental details, calculating estimated cost, and confirming with the user. This step will be further explained in FIG. 4. In this embodiment, the program 104 identifies user indicated preferences by using machine learning algorithms and artificial intelligence algorithms, after receiving user consent via an opt-in/out-out mechanism, to access user information to generate user preferences based on personality profiles, financial information, social media accounts. For example, the program 104 identifies that user A would prefer task to be completed during the weekday and not the weekend. In this embodiment, the program 104 identifies environmental parameters of the task using precision sensors incorporated within the device. For example, the program 104 identifies the amount of area surrounding the device, the topography of the area surrounding the device, the temperature, the moisture of the soil, and the length of the grass or crop. In this embodiment, the program 104 calculates estimated cost of the task by analyzing user indicated preferences and environmental details, calculating the cost of each service based on usage, time, and area of task, and aggregating the cost of each into a total cost. For example, the program 104 calculates the cost to cut three acres of grass, where there are four hills within those three acres, which increases the cost by the extra time it takes to cut the grass on the hills. In this embodiment, the program 104 confirms the estimated cost with the user by transmitting the estimated cost to the computing device 102. For example, before the task is performed, the program 104 transmits the estimated total cost to the user's smart phone. In another embodiment, the program 104 optimizes the task to meet identified parameters and environmental details before calculating cost and confirming with the user. In another embodiment, the program 104 optimizes the task based on assigned user ownership percentage.

In step 206, the program 104 performs the task. In this embodiment, the program 104 performs the task associated with the received operational parameters based on the optimization by using artificial intelligence algorithms and precision sensors to remotely operate the device and its features to perform the task. In this embodiment, the program 104 places the device in a location to perform the task by using real-time track algorithms to monitor the location of the device and the task. In this embodiment, the program 104 operates the device by using precision sensors incorporated within the device to access the device's motor and features to perform the task. In this embodiment, the program 104 terminates operation of the device by using machine learning algorithms and artificial intelligence to determine the completion of a task. For example, the program 104 places the device at the edge of the three-acre land, turns on the engine and blades, and cuts the grass until the cost exceeds the limit, the time usage exceeds the limit, or the entire area is cut.

Figure 3:
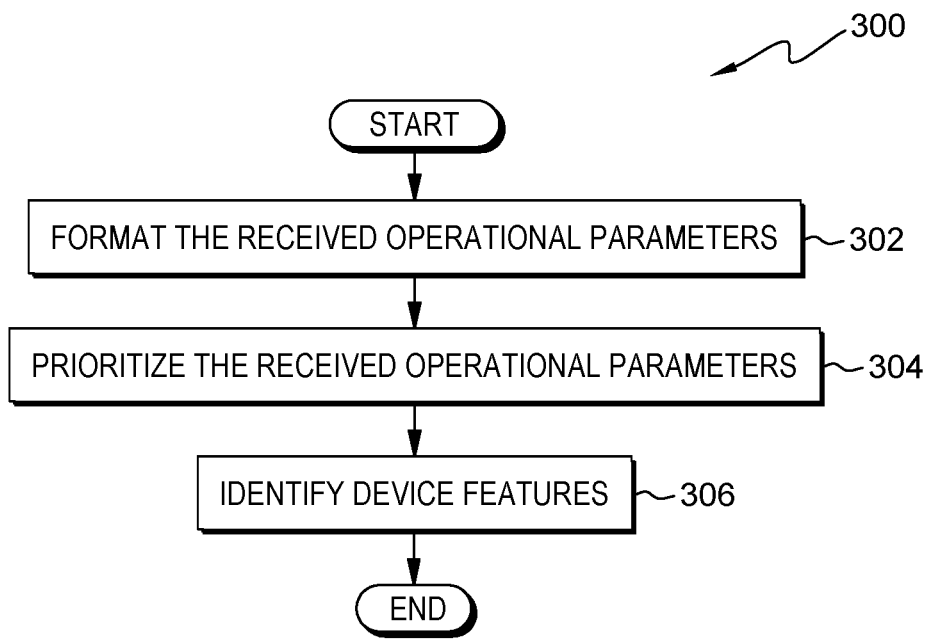
FIG. 3 is a flowchart illustrating operational steps for receiving operational parameters in the management application, in accordance with at least one embodiment of the present invention.

FIG. 3 is a flowchart 300 illustrating operational steps for configuring operational parameters in the management application, in accordance with at least one embodiment of the present invention.

In step 302, the program 104 formats the received operational parameters. In this embodiment, the program 104 formats the received operational parameters by organizing configured costing options and configured operational parameters within a management application. In this embodiment, the program 104 configures costing options by receiving input on at least one cost model. For example, the program 104 configures the costing option of the management application to be based under a fixed cost model. In this embodiment, the program 104 configures operational parameters by using machine learning algorithms and artificial intelligence algorithms to analyze details of the operation. For example, the program 104 configures task parameters of the task to detail property boundaries, entry points of the device, features of the device to use, and scheduling/time preference of the task.

In step 304, the program 104 prioritizes the received operational parameters. In this embodiment and in response to formatting the received operational parameters, the program 104 ranks the received operational parameters and prioritizes the received operational parameters based on rank. In this embodiment, the program 104 priorities the received operational parameters by using a ranking algorithm to apply assigned values based on user indicated preferences. The program 104 assigns a value that relates with the number of users that are involved with the management application and collects data from each user involved with the management application. The program 104 determines the rank of a user indicated preference based on initial user contribution, which also determines the percentage of a user's ownership of the device. In this embodiment, the lowest rank a user can receive is 1, and the higher the percentage of user ownership, the closer the user is to receiving a rank of 1. For example, there are three users of the management application, so the ranking scale is from 1-3. In this example, user A has a 60% ownership percentage, user B has a 30% ownership percentage, and user C has a 10% ownership percentage, so the program 104 ranks user A 1st, user B 2nd, and user C $3^{rd}$.

In step 306, the program 104 identifies device features. In this embodiment and in response to prioritizing the ranked operational parameters, the program 104 identifies device features by accessing precision sensors incorporated within the device that can be used in conjunction with the prioritized operational parameters. In this embodiment, the program 104 accesses precision sensors by transmitting instructions to the precision sensors using the network 106. In this embodiment, the program 104 identifying device features using precision sensors to be used to satisfy the prioritized operational parameters. In this embodiment and in response to accessing precision sensors, the program 104 performs a diagnostic test of the device and identifies the features of the device. For example, the program 104 performs a diagnostic test of the smart tractor to identify the harvesting feature, the distributing feature, and the crop shearing feature of the device.

Figure 4:
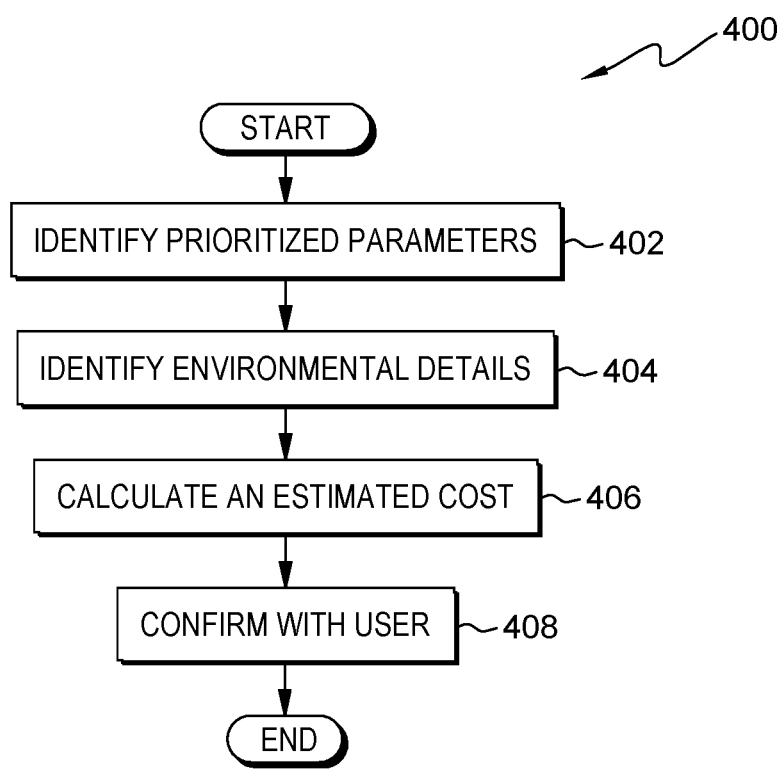
FIG. 4 is a flowchart illustrating operational steps for optimizing operational parameters in the management application, in accordance with at least one embodiment the present invention.

FIG. 4 is a flowchart 400 illustrating operational steps for optimizing operational parameters in the management application, in accordance with at least one embodiment the present invention.

In step 402, the program 104 identifies prioritized parameters. In this embodiment, the program 104 identifies prioritized parameters based on the user indicated preferences. In this embodiment, the program 104 identifies user indicated preferences by analyzing user indicated preferences manually input in the management application and the received operational parameters of the task.

In step 404, the program 104 identifies environmental details. In this embodiment, the program 104 identifies environmental details by accessing precision sensors incorporated within the device to collect data of the environment surrounding the device. In this embodiment, the program 104 locates the device by using precision sensors located within the device and global positioning system ("GPS") algorithms to track the device's location in real-time and map the environment surrounding the device. In this embodiment, the program 104 communicates with the precision sensors by transmitting instructions through the network 106. In another embodiment, the program 104 locates the device by using precision sensors located within the device and geo-fencing algorithms around the area that the task is to be performed. For example, the program 104 locates the precision sensors in the smart mower at the three-acre patch of land, and the program 104 uses GPS to track the movement of the smart mower in real time.

In step 406, the program 104 calculates an estimated cost associated with the task. In this embodiment, an estimated cost can include an estimated cost of the task, and an estimated cost based on output for each user based on ownership as defined in greater detail below.

In instances where the program 104 estimates a cost by estimating costs associated with completing the task, the program 104 calculates estimated cost of the task in response to identifying prioritized parameters and environmental details. For example, the program 104 calculates each service of the device based on usage, time, and area of task, and aggregating the cost of each into a total cost. In this embodiment, the program 104 estimates a cost of a task by determining a calculation value based on the costing model based on the received operational parameters. The calculation value differs for each costing model and may be based on the value of the task itself, value of the task per user, and risk of the task. In one embodiment, the program 104 calculates the value of the task by calculating the value of each received parameter and aggregating the amount to determine a total value. For example, the program 104 calculates and adds the cost for the amount of gas needed to mow a three-acre patch of land, the cost to clean the debris of the mowed grass, and the cost for mowing during peak hours to find the total cost.

In instances where the program 104 estimates the cost of a task based on output and optimized operational parameters, the program 104 calculates the cost of the task to meet the configured operational parameters. For example, the program 104 assigns a value for each feature of the device, a value for the time of operation measured in timed intervals, a value for the time for each feature of the device measured in timed intervals, and manually input values form the user based on the details of the task. In this embodiment, the program 104 estimates a cost by using a determination engine algorithm to calculate the assigned value of each feature and compares the aggregated values of the task with the prioritized parameters based on the user indicated preferences and environmental details. In this embodiment, the program 104 optimizes the task in order to meet the identified user preferences and environmental details, which may lead to the device's failure to complete the received operational parameters. For example, the program 104 receives the user indicated preferences as willing to perform only three acres of harvesting, and the environmental details of the area to be harvested is calculated to be 3.5 acres; the program 104 transmits instructions to the device to only harvest the three acres in the center of the area.

In instances where the program 104 estimates the cost of a task based on ownership, the program 104 calculates the cost of the task based on the output for each user based on ownership percentage. For example, the program 104 calculates percentages based on initial participant contribution by using machine learning algorithms and accounting algorithms to determine ownership percentage of the device and calculates the cost of output percentage based on the ownership percentage. For example, the program 104 calculates the task to output 100 kgs of wheat, and user A has a 60% ownership percentage, user B has a 30% ownership percentage, and user C has a 10% ownership percentage. In this example, the program 104 calculates the output of the task as user A receiving 60 kgs, user B receiving 30 kgs, and user C receiving 10 kgs.

In step 408, the program 104 confirms the task with the user. In this embodiment and prior to the task being performed, the program 104 transmits a notification that details the identified user preferences, the identified environmental details, and the estimated cost and allows the user to manually input a confirmation to the transmitted notification. In this embodiment and in response to the user confirming the task, the program 104 apportions costs and subsequently charges for the performance of the device and transmits the apportioned cost and a receipt of the charges to user. In another embodiment, the program 104 automatically performs the task based on user indicated preferences and received operational parameters. In another embodiment, the program 104 executes and revises agreements to perform tasks with user confirmation.

Figure 5:
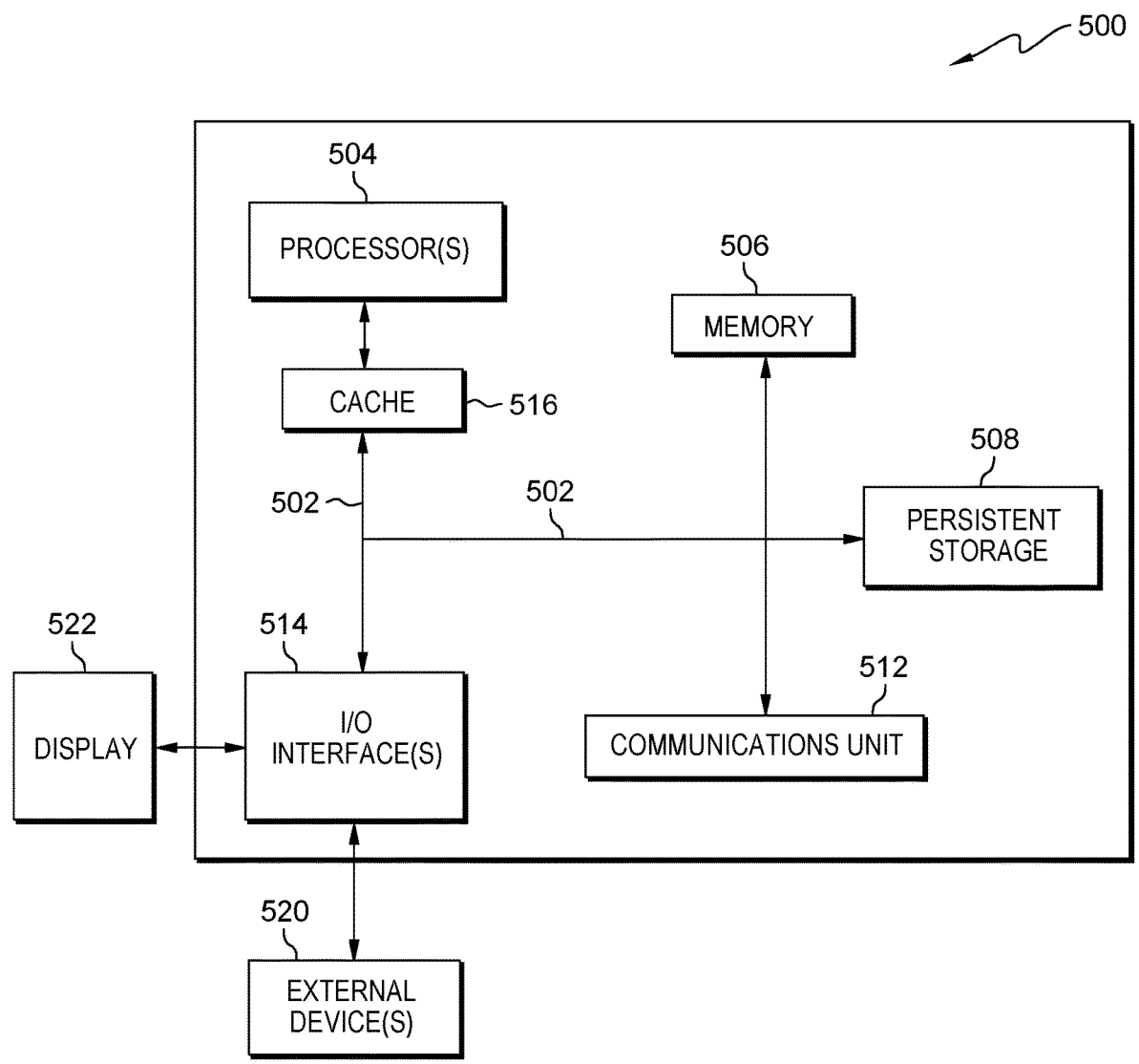
FIG. 5 is a functional block diagram depicting components of a computing systems within a haptic display environment of FIG. 1, in accordance with an embodiment of the present invention.

FIG. 5 depicts a block diagram of components of computing systems within a computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 500 includes a communications fabric 502, which provides communications between a cache 516, a memory 506, a persistent storage 508, a communications unit 510, and an input/output (I/O) interface(s) 512. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses or a crossbar switch.

The memory 506 and the persistent storage 508 are computer readable storage media. In this embodiment, the memory 506 includes random access memory (RAM). In general, the memory 506 can include any suitable volatile or non-volatile computer readable storage media. The cache 516 is a fast memory that enhances the performance of the computer processor(s) 504 by holding recently accessed data, and data near accessed data, from the memory 506.

The program 104 may be stored in the persistent storage 508 and in the memory 506 for execution by one or more of the respective computer processors 504 via the cache 516. In an embodiment, the persistent storage 508 includes a magnetic hard disk drive. Alternatively, or in addition to a magnetic hard disk drive, the persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 508 may also be removable. For example, a removable hard drive may be used for the persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 includes one or more network interface cards. The communications unit 510 may provide communications through the use of either or both physical and wireless communications links. The program 104 may be downloaded to the persistent storage 508 through the communications unit 510.

The I/O interface(s) 512 allows for input and output of data with other devices that may be connected to a mobile device, an approval device, and/or the server computing device 108. For example, the I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 508 via the I/O interface(s) 512. The I/O interface(s) 512 also connect to a display 520.

The display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

What is claimed is:

1. A computer-implemented method comprising:
receiving a request for a task to be performed, wherein the task is to be performed using a device with a precision sensor, and wherein the precision sensors identify at least one task selected from the group consisting of grass cutting, crop harvesting, and fertilization distribution;
in response to receiving the request for the task to be performed, optimizing configured operational parameters based on prioritized user parameters and environmental details associated with the task, wherein the environmental details include at least one of the group consisting of a local topography, a temperature, and a soil moisture content;
calculating a value of the task based, at least in part, on the optimized configured parameters, environmental details associated with the task, and the prioritized user parameters; and
performing the task with the device based on the optimized configured parameters and the calculated value, wherein the precision sensor tracks the device as the device performs the task.

2. The computer-implemented method of claim 1, wherein optimizing operational parameters comprises:
receiving a plurality of operational parameters;
formatting the received plurality of operational parameters based on at least one organized costing option and at least one user indicated preference;
prioritizing the formatted operational parameter of the plurality of operational parameters against other received operational parameters based on the formatted received operational parameter by ranking the received plurality of operational parameters; and
identifying device features using precision sensors to be used to satisfy the prioritized operational parameters.

3. The computer-implemented method of claim 1, wherein optimizing configured operational parameters comprises transmitting instructions to precision sensors to track a specific location of a device, wherein the precision sensors are incorporated in the device.

4. The computer-implemented method of claim 1, wherein optimizing configured operational parameters comprises using at least one cost model.

5. The computer-implemented method of claim 1, wherein calculating value of the task comprises:
calculating an estimated cost based on identified user parameters and the environmental details associated with the task; and
confirming the calculated, estimated cost with a user prior to performing the task.

6. The computer-implemented method of claim 1, wherein calculating value of the task comprises estimating a cost to meet the configured operational parameters based on identified prioritized parameters and environmental details.

7. The computer-implemented method of claim 1, wherein calculating value of the task comprises estimating a cost based on optimized operational parameters by using a determination engine algorithm.

8. The computer-implemented method of claim 1, wherein calculating value of the task comprises estimating a cost based on output for each user by using assigned ownership percentages.

9. The computer-implemented method of claim 1, wherein performing the task comprises transmitting optimized instructions to precision sensors incorporated within a device based on an estimated cost to meet the configured operational parameters based on identified prioritized parameters and environmental details.

10. The computer-implemented method of claim 1, further comprising calculating values of multiple tasks.

11. A computer program product comprising:
one or more computer readable storage media and program instructions stored on the one or more computer readable storage media, the program instructions comprising:
program instructions to receive a request for a task to be performed, wherein the task is to be performed using a device with a precision sensor, and wherein the precision sensors identify at least one task selected from the group consisting of grass cutting, crop harvesting, and fertilization distribution;
in response to receiving the request for the task to be performed, program instructions to optimize configured operational parameters based on prioritized user parameters and environmental details associated with the task, wherein the environmental details include at least one of the group consisting of a local topography, a temperature, and a soil moisture content;
program instructions to calculate a value of the task based, at least in part, on the optimized configured parameters, environmental details associated with the task, and the prioritized user parameters; and
program instructions to perform the task with the device based on the optimized configured parameters and the calculated value, wherein the precision sensor tracks the device as the device performs the task.

12. The computer program product of claim 11, wherein the program instructions to optimize configured operational parameters comprise:
program instructions to receive a plurality of operational parameters;
program instructions to format the received plurality of operational parameters based on at least one organized costing option and at least one user indicated preference;
program instructions to prioritize the formatted operational parameter of the plurality of operational parameters against other received operational parameters based on the formatted received operational parameter by ranking the received plurality of operational parameters; and
program instructions to identify device features using precision sensors to be used to satisfy the prioritized operational parameters.

13. The computer program product of claim 11, wherein the program instructions to optimize configured operational parameters comprise program instructions to transmit instructions to precision sensors to track a specific location of a device, wherein the precision sensors are incorporated in the device.

14. The computer program product of claim 11, wherein the program instructions to optimize configured operational parameters comprise program instructions to use at least one cost model.

15. The computer program product of claim 11, wherein the program instructions to calculate a value of the task comprise:
program instructions to calculate an estimated cost based on identified user parameters and identified environmental details; and
program instructions to confirm the calculated estimated cost with a user prior to performing the task.

16. The computer program product of claim 11, wherein the program instructions to calculate a value of the task comprise program instructions to estimate a cost to meet the configured operational parameters based on identified prioritized parameters and environmental details.

17. The computer program product of claim 11, wherein the program instructions to calculate a value of the task comprise program instructions to estimate a cost based on optimized operational parameters by using a determination engine algorithm.

18. The computer program product of claim 11, wherein the program instructions to calculate a value of the task comprise program instructions to estimate a cost based on output for each user by using assigned ownership percentages.

19. A computer system comprising:
one or more computer processors;
one or more computer readable storage media; and
program instructions stored on the one or more computer readable storage media for execution by at least one of the one or more processors, the program instructions comprising:
program instructions to receive a request for a task to be performed, wherein the task is to be performed using a device with a precision sensor, and wherein the precision sensors identify at least one task selected from the group consisting of grass cutting, crop harvesting, and fertilization distribution;
in response to receiving the request for the task to be performed, program instructions to optimize configured operational parameters based on prioritized user parameters and environmental details associated with the task, wherein the environmental details include at least one of the group consisting of a local topography, a temperature, and a soil moisture content;
program instructions to calculate a value of the task based, at least in part, on the optimized configured parameters, environmental details associated with the task, and the prioritized user parameters; and
program instructions to perform the task based on the optimized configured parameters and the calculated value, wherein the precision sensor tracks the device as the device performs the task.

20. The computer system of claim 19, wherein the program instructions to optimize configured operational parameters comprise:
program instructions to receive a plurality of operational parameters;
program instructions to format the received plurality of operational parameters based on at least one organized costing option and at least one user indicated preference;
program instructions to prioritize the formatted operational parameter of the plurality of operational parameters against other received operational parameters based on the formatted received operational parameter by ranking the received plurality of operational parameters; and
program instructions to identify device features using precision sensors to be used to satisfy the prioritized operational parameters.

* * * * *